Sept. 16, 1958 D. K. JOVANOVICH 2,852,207
CONVERTIPLANE
Filed Dec. 16, 1954 2 Sheets-Sheet 1
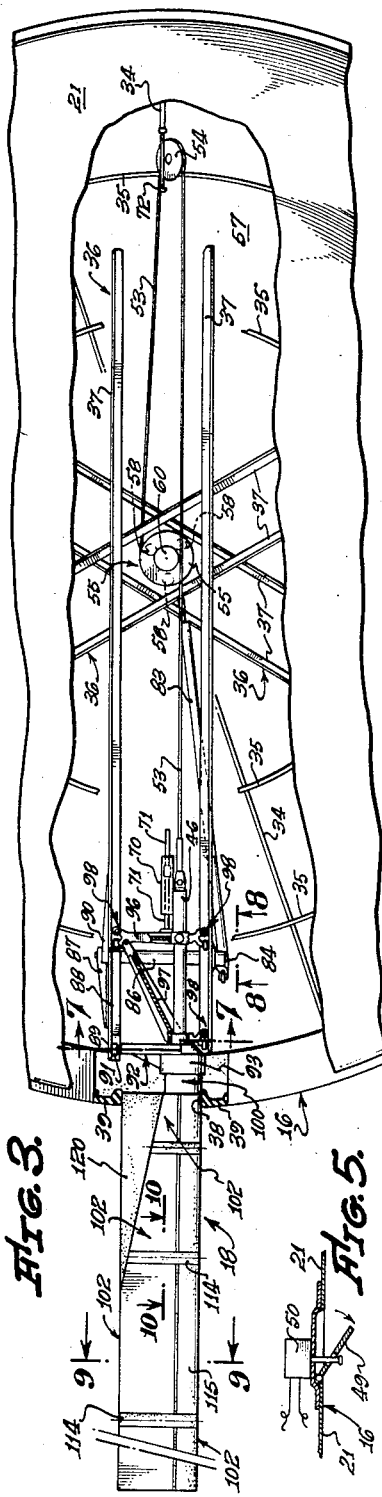
DRAGO K. JOVANOVICH,
INVENTOR.
By H. Calvin White
ATTORNEY.

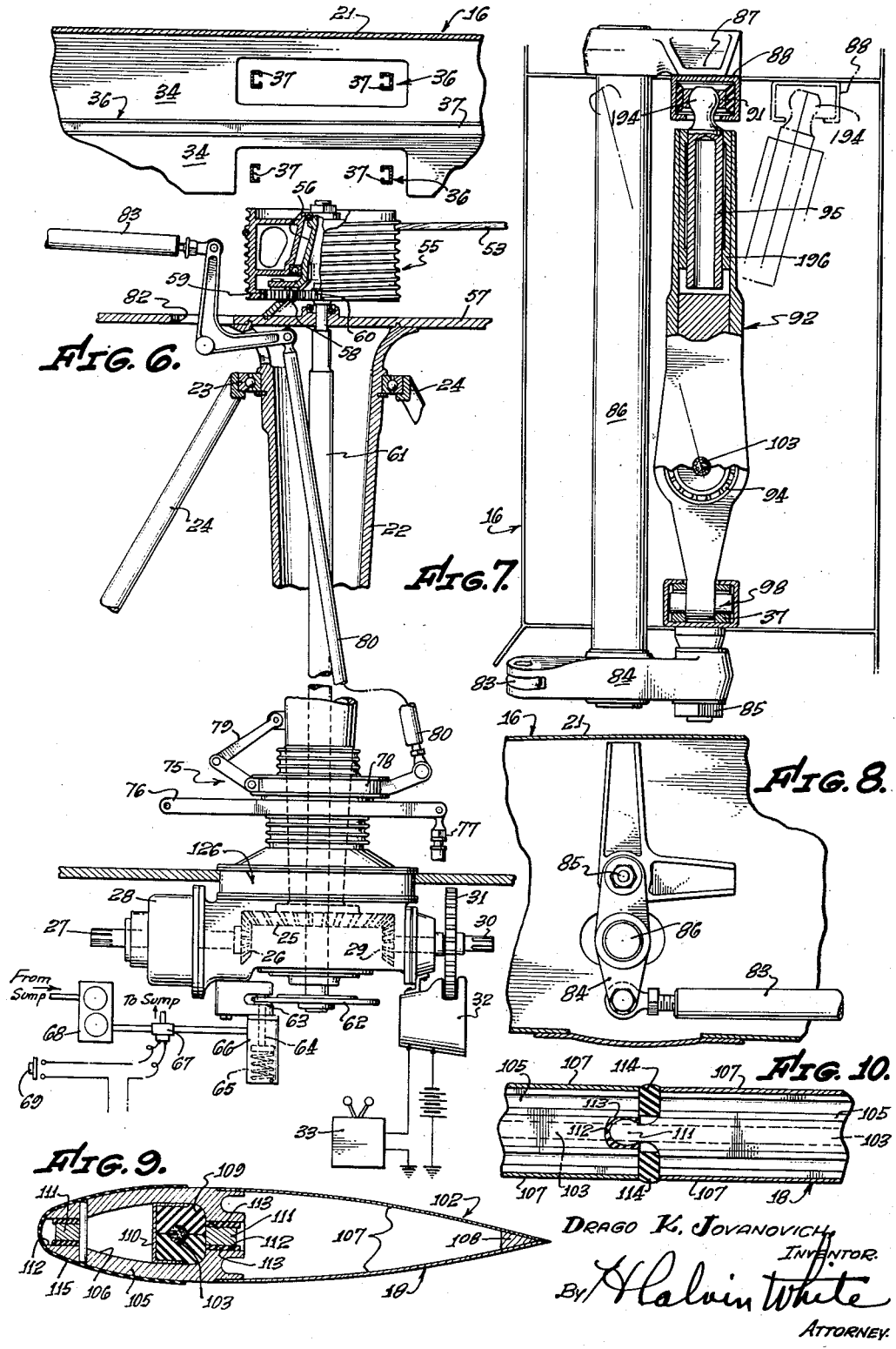

United States Patent Office 2,852,207
Patented Sept. 16, 1958

2,852,207

CONVERTIPLANE

Drago K. Jovanovich, Los Angeles, Calif.

Application December 16, 1954, Serial No. 475,702

20 Claims. (Cl. 244—7)

This invention concerns aircraft of the type generally known as convertible, or capable of being converted in flight from rotary wing to fixed wing aircraft or vice versa. More specifically, the invention has to do with a convertible aircraft utilizing a disc-shaped airfoil as a fixed wing surface and also as the hub of a rotary wing blade system, the airfoil serving to house the blades during relatively high speed flight and mounting the blades for extension outside the airfoil for relatively low speed flight.

Certain advantages in aircraft performance over conventional helicopters and airplanes are recognized to be realizable by use of such a disc-shaped airfoil in conjunction with a rotary blade system. Such advantages include the ability of the aircraft to take-off vertically as a helicopter, climb to altitude and gain forward speed to transition speed, and finally to convert to normal airplane flight in the higher speed ranges upon retraction of the blades. Forward speeds much higher than those possible with conventional helicopters are possible since blade retraction into the airfoil eliminates the possibility of blade stall at high forward speeds. Furthermore, blade fatigue is considerably reduced on an overall flight basis, since the blades are not used during the entire flight as is necessary in helicopter operation.

Various approaches to convertible flight that have been considered in the past include the utilization of a disc-shaped airfoil carrying fixed pitch blades capable of extension and retraction from and into the airfoil, the latter being universally mounted at its center for controllable inclination both transversely and longitudinally to give corresponding directional thrust to the aircraft. One basic disadvantage with such an airfoil and rotor blade system resides in the necessary tilting of the relatively large airfoil with respect to the longitudinal axis of the aircraft fuselage, forward inclination of the airfoil to gain forward thrust having the effect of presenting a downwardly inclined surface to the direction of the approaching airstream, creating a downloading on the airfoil with resultant downward displacement of the aircraft. This condition necessarily presents complex problems having to do with stability and a control of the aircraft in flight.

Another problem which is presented concerns the size limitations imposed upon the airfoil and blades deriving from the conflicting requirements that the aircraft be capable of relatively high forward speed and that the blades be fully retractable into the airfoil for airplane flight. In the first place, the size of the blades, and more importantly their length, is governed by the requirement that sufficient lift be produced for helicopter take-off and for desired vertical acceleration. The length of the blades controls the radial dimension of the airfoil, since the latter must accommodate blade housing, and in the past it has been thought necessary that the length of the blades be less than the radius of the airfoil in order that the blades might be retracted toward the center of the airfoil. As a practical matter, the size of the airfoil so required is too large from the standpoint of forward speed limitations thereby imposed, since top forward speed is reduced as the size of the airfoil increases for the same power. In addition, for the same overall diameter of the extended blades, it is advantageous to reduce the size of the disc-shaped airfoil in order to increase the annular area swept by the rotating blades to improve performance of the aircraft in the helicopter configuration.

The present invention is primarily directed to the solution of the above problems through the provision of an airfoil capable of housing rotor blades for extension and retraction, the airfoil being mounted for rotation and the blades controllable in such a way that universal inclination of the air foil is not necessary to gain directional thrust control for the aircraft. Furthermore, the airfoil structure of the present invention accommodates the retraction of the blades beyond the major axis of the disc so that the blades themselves may have lengths greater than the radius of the airfoil, in order that the diameter of the circle described by the blade tips when fully extended may be reduced. As a result, forward speed of the aircraft may be considerably increased, and safe entrance into the conversion speed zone may be realized. The invention also contemplates sizing of the airfoil disc between 33% and 50% of the diameter of the circle described by the blade tips when fully extended for maximum flight efficiency; and in addition, the transverse dimension of the horizontal stabilizer section of the aircraft is desirably dimensioned between 30% and 55% of the blade tip circle for best stability and control. To the outer portions of these stabilizers there may be connected ailerons, to aid in controlling the aircraft in flight, as will be described, or alternatively, the ailerons may be mounted on stub wings projecting from opposite sides of the fuselage beneath the disc-shaped airfoil.

Provision is made for effecting collective and cyclic pitch control of the rotor blades relative to the disc when the blades are fully extended in order that the ratio of blade loading to airfoil loading during forward flight may be varied smoothly to accomplish efficient transition from helicopter or autogyro flight to airplane flight or vice versa. Blade pitch control relative to airfoil inclination enables controllable autogyration during the flight cycle as will be described.

In accordance with the above purposes and objects, the disc-shaped airfoil is mounted above the aircraft to rotate about a fixed axis extending upward from the fuselage so that the inclination of the airfoil relative to the fuselage does not change. Torque is transmitted to the airfoil through a one-way clutch allowing free rotation of the airfoil when its angular velocity exceeds the input angular velocity supplied by the aircraft engine, this arrangement providing for autogyration of the rotor when sufficient forward speed of the aircraft has been gained to drive the rotor at such increased speed. There is also provided a brake for arresting rotation of the airfoil during airplane flight and during non-operation of the convertible aircraft.

A number of radially extending tracks are contained in the airfoil for guiding blade displacement during extension and retraction thereof outside and inside the airfoil. These tracks extend from openings in the airfoil periphery toward and beyond the center of the airfoil in vertically staggered relation to house blades having a length greater than the airfoil radius. Blade support carriages are constrained to travel radially in the tracks and mount the root ends of the blades for pivotal movement about their pitch axes. In order that the carriages may be extended and retracted, cables are connected between the carriages and a central drum in such a way that as the drum rotates relative to the airfoil, the carriages will be radially displaced. A braking device is provided to resist rotation of the drum at those times when blade retraction is desired, so that as the airfoil continues to rotate, the cables wind themselves on the drum and displace the blade carriages and blades inwardly. Blade extension, on the other hand may be conveniently accomplished through releasing of the brake mechanism allowing free rotation of the drum and rapid unwinding of the cables thereon due to the application of centrifugal force supplied by the rotated blades.

As referred to above, the rotor blade system is subject to cyclic and collective pitch control relative to the plane of the airfoil in order to vary the direction of thrust transmitted to the aircraft. For this purpose, the root end of each blade is provided with a pitch arm conveniently housed in the airfoil and engaged by a pivoted section of track forming a radial extension of the carriage track. Pivoting of this short section of track to accomplish displacement of the blade pitch arm is controlled by a push-pull linkage interconnecting the track section with a conventional swashplate mechanism, to be described. The blades themselves are formed to include a number of end-to-end sections and joints interconnecting these sections for limited pivoting about their chordal axes and in the plane of rotation thereof and to resist pivoting about the blade pitch axes. The sections of each blade are held together in end-to-end relation by a tension cable extending through the sections and connected to a blade carriage.

As contemplated, the novel convertiplane is well adapted to the following described flight cycle. Prior to take-off, the airfoil is driven up to take-off speed and the blades extended centrifugally for take-off in the helicopter configuration, followed by a short accelerating run and climb to an altitude considered safe for the autogyro conversion. When sufficient forward speed has been gained, as by means of the forward propulsion unit, the rotor blades system may be put into autogyration by disconnecting the clutch between the engine and the airfoil drive system. Climb is continued in the autogyro configuration until the desired cruising altitude is reached, at which time the collective pitch of the blades is reduced and forward speed increased. As the airplane conversion speed is approached, the airfoil gradually assumes more of the lifting load relinquished by the rotor blades which are now rotating at reduced speed due to diminished autogyration effect. The blade collective pitch is further reduced as the desired time for conversion is approached and when the rotor speed slows to a predetermined value, the blades are withdrawn by applying braking force to the drum. Energy to retract the blades oppositely to centrifugal loading is derived from the kinetic energy of rotation of the airfoil, and if properly sized, the speed of rotation of the airfoil does not materially increase during blade retraction. The aircraft is now in condition for airplane flight.

Transition from airplane to autogyro flight is effected by engaging the clutch between the engine and the airfoil drive system to rotate the airfoil with sufficient speed to accomplish centrifugal extension of the blades, transition time requiring only a few seconds after the airfoil is driven up to speed. Following blade extension, power input to the airfoil is interrupted, since autorotation is maintainable through pitch control of the rotor blades. Once the landing area has been located, a normal autogyro descent may be made where a landing run is possible. Naturally, the application of power to the rotor will allow a controlled descent and landing, or hovering as a helicopter upon further decrease in forward speed.

Other features and objects of the invention, as well as the details of an illustrative embodiment, will appear more fully understood from the following description of the accompanying drawings, in which:

Fig. 1 is a plan view of the convertiplane;

Fig. 2 shows the convertiplane in elevation;

Fig. 3 is a fragmentary plan view of the circular airfoil showing the internal structure thereof;

Fig. 4 is an enlarged sectional view taken through the airfoil illustrating details of the mounting means for the rotor blade;

Fig. 5 is a view of one of the flaps carried by the disc-shaped airfoil;

Fig. 6 is an enlarged elevational view of the airfoil drive mechanism together with details of the rotor blade control mechanism and retraction mechanism;

Fig. 7 is an enlarged sectional view of a portion of the rotor blade control mechanism taken on line 7—7 of Fig. 3;

Fig. 8 is an enlarged fragmentary view of another portion of the rotor blade control mechanism taken on line 8—8 of Fig. 3;

Fig. 9 is a section taken through the rotor blade on line 9—9 of Fig. 3; and

Fig. 10 is a section taken on line 10—10 of Fig. 3.

As shown in Figs. 1 and 2, the convertiplane comprises a fuselage 10 having a tail section 11 including transverse stabilizers 12 and rudders 13 at the outer ends thereof, and an engine driven propeller 14 at the forward end of the fuselage. Rigidly mounted for rotation about an axis 15 projecting vertically from the fuselage is a disc-shaped airfoil 16 comprising essentially a fixed wing operative in flight as a lifting surface, its lifting efficiency being reduced at lower forward speeds and substantially increased at higher forward flight speeds. In general, the overall transverse extent of the stabilizers on opposite sides of the fuselage is shown to be substantially equal to the diameter of the airfoil 16 for optimum flight efficiency and control, the stabilizer surfaces being relatively large. Located on the outboard portions of the stabilizers are ailerons 17 adapted to serve their usual function. Alternatively, ailerons 130 may be carried by stub wings 131, which may be provided for the aircraft beneath the airfoil 16 to project from opposite sides of the fuselage.

The disc-shaped rotor 16 is of sufficient size to produce required lift for the convertiplane at high forward speeds, as during airplane flight conditions, and its size is not substantially larger than that required to produce such lift since larger airfoils tend to increase drag, as brought out in the introduction. The airfoil contains structure for housing a number of rotor blades 18 in substantially radially position to permit their radial retraction and extension from the airfoil as desired. When extended and rotated, the blades describe a tip circle 19 which lies above the tops of the rudders 13 and slightly forward thereof to preclude contact therewith. A tail rotor 20 serves to counteract reaction torques produced by the rotating airfoil and rotor blade system, so as to maintain the aircraft in desired flight direction.

The disc-shaped airfoil 16 includes top and bottom surfaces 21, the latter surface being supported at its center for rotation by a plate 57 connected to a tapered tubular rotor shaft 22, shown in Fig. 6. The latter is centered for rotation above the fuselage by bearing 23 carried in support structure 24, and is joined at its lower end to a bevel gear 25 which is driven by pinion 26 in housing 126. Input power is transmitted to pinion 26 through input shaft 27 and one-way clutch 28, allowing free rotation of the rotor shaft when its speed exceeds the speed of the input shaft divided by the step-up ratio of the right angle bevel gear drive. In addition, clutch 28 may be controlled to disconnect the input shaft from rotor drive shaft at any time to allow the latter to freely rotate. Bevel gear 25 is also connected to pinion 29 transmitting power through output shaft 30 to the tail rotor 20, so that rotation of the airfoil is always accompanied by tail rotor rotation. A braking disc 31 is conveniently keyed to shaft 30 for engagement by solenoid controlled brake 32. The latter is controlled by a fly-ball governor 33 sensitive to the speed of rotation of the airfoil and operative to close a switch for energizing brake 32, slowing the airfoil whenever its speed drops below a predetermined value, and locking it against rotation upon stopping.

Referring again to the disc-shaped airfoil 16, its internal structure comprises a plurality of radial ribs 34 and concentric stringers 35 supporting three radial track sections 36. Each section includes a pair of spaced channels 37 which face one another as shown in Fig. 6 to provide guides for a rotor blade support carriage to be described. In addition, each track section extends from a point near the periphery inside the airfoil back toward and through the center thereof in vertically staggered relation, providing for retraction of the blades beyond the center of the airfoil, so that the lengths thereof may be greater than one-half the diameter of the airfoil and less than the diameter thereof. As a result, the airfoil may be advantageously sized to have a diameter between one-half and one-third the diameter of the tip circle described by the rotor blades when extended and rotated.

As shown in Figs. 3 and 4, the periphery of the airfoil is provided with openings 38 through which the blades are adapted to be extended and retracted, each opening being surrounded by a one-piece blade guide including front and rear rubber blade guides 39 and upper and lower rubber guides 40. The latter are hinged at their inner ends 41 and seated in pockets formed in the disc surfaces 21 for displacement toward and away from the surfaces of the rotor blade 18, and metallic detents 42 are molded into the guides 40 and mounted to resiliently urge the guides toward the rotor blade surfaces while allowing deflection away from the surfaces in accordance with blade deflection. For this purpose, each detent is attached at its inner end to a support 43 suspended from the inside of the airfoil skin and fulcrumed about a lip 44 provided by an extension of the support 43.

The disc-shaped airfoil contains a blade retention fitting 45 extending in the direction of blade retraction and extension and mounted to a stringer 35. Fitting 45 provides surfaces adapted to guide upper and lower portions of the blade and retention housing 46 in radial displacement during blade retraction or extension, and also serves to latch opposite ends of a pin 47 carried by the housing 46 in a U-shaped pocket 48 provided at the inboard end of the fitting and shown in section in Fig. 4. Latching of pin 47 occurs when the blade 18 is fully extended from the airfoil and prevents further radial displacement thereof. In the bottom surface of the airfoil there are also mounted several flaps 49 which are hinged to freely swing downward and outward away from surface 21, as desired, except when retracted by solenoid 50 or other type actuators. Each solenoid includes an arm 51 passing through a slot in a flap allowing free pivoting of the flap, except upon arm retraction, which causes a shoulder on the end of the arm to engage the flap and retract it flushly against the airfoil surface. When extended in freely hinged condition, the flaps project into the air stream flowing across the airfoil to pick up the flow energy of the air stream and transmit such energy to the airfoil to increase its speed of rotation, as by a windmill effect. When sufficient airfoil speed is gained, the flaps are readily retracted by the solenoids.

To retract and extend the blades 18 into and out of the airfoil, the blade retention housings 46 in which the blades are carried are connected at their inner ends to cables 53 extending inwardly past the center of the airfoil and over idler pulleys 54, which are carried by the internal structure of the airfoil. The cables are carried back toward the center of the airfoil from the pulleys and wound on a central drum 55 in the same direction, so that rotation of the drum relative to the airfoil will bring about extension or retraction of the blades depending on whether the drum is rotating faster or slower than the airfoil. The drum itself is mounted for rotation on a support 56, which is connected to plate 57 on which the airfoil is mounted, and three planetary gears 58 are pinned on the support 56 so that they may rotate not only with the airfoil but also about their pin axes. Gears 58 engage an internal gear 59 on drum 55 and a central or sun gear 60 connected to the upper end of shaft 61. The latter is journaled for rotation in plate 57 and extends vertically downward through rotor shaft 22 and through housing 126, there being a clutch disc 62 connected to the bottom of the shaft 61. Disc 62 is normally engaged by pressure pad 63 carried at the end of a plunger 64 urged toward the disc by spring 65 in cylinder 66. To release the disc clutch, fluid is admitted to cylinder 66 through a conventional three-way valve 67 under pressure developed by pump 68, which is driven by the aircraft engine, valve 67 being controlled by push button switch 69.

When shaft 61 is clutched against rotation, as for example when the liquid pressure from pump 68 is cut-off from cylinder 66, drum 55 rotates relative to the airfoil since sun gear 60 is locked. Under these conditions, cables 53 will automatically wind themselves on the drum and retract the blades into the airfoil. Pressure pad 63 is adjusted to allow slippage of disc 62 under torque loads above those necessary to retract the blades, so that when the blades are retracted the clutch remains engaged but slips, and thereby brakes airfoil rotation. When blade extension is desired, push button 69 is actuated to cause valve 67 to admit fluid pressure to cylinder 66, resulting in unlocking of shaft 61 and free rotation of sun gear 60. As a result, drum 55 is free to rotate since the planetary gears 58 are not constrained, and centrifugal force will carry the rotor blades radially outwardly from the rotating airfoil.

Referring back to Figs. 3 and 4 it will be observed that an air or hydraulic shock strut 70 is carried by the blade retention housing 46 to travel with housing 46 as it is retracted or extended relative to the airfoil. At opposite ends of the strut there are provided plungers 71 adapted to engage seats 72 and 73 carried respectively by the airfoil structure supporting idler pulley 44 and by retention fitting 45. The shock strut mechanism serves to cushion the impact of the blade retention housing against the airfoil structure during the final phases of retraction and extension.

To obtain directional control of the convertiplane during helicopter flight conditions, the rotor blades 18 are subjected to cyclic as well as collective pitch control during their rotation by mechanism which will now be described. Referring to Fig. 6, a conventional swashplate mechanism 75 is provided and is shown to include an axially displaceable and longitudinally and laterally tiltable plate 76 controlled by push rods 77. Journaled in non-rotatable plate 76 is a spider 78 rotated by scissors linkage 79, the latter being connected to the rotor shaft 22. Tilting and axial displacement of rotating spider 78 is transmitted to the blades to effect pitch control thereof through push-pull linkages including links 80 connected between the spider and bell cranks 81 mounted for rotation with the airfoil. One leg of each bell crank extends through an opening 82 in plate 57 and into the airfoil for connection with a radial link 83, the outer end of which is pivotally connected to a lever 84 which rotates about a pivot 85 as better shown in Figs. 7 and 8.

A transverse torque tube 86 has one end thereof connected to the lever 84 in spaced relation to the pivot 85 and the opposite end thereof joined to an arm 87, so that radial displacement of link 83 will swing torque tube 86 and arm 87 about the axis of pivot 85. This motion is transmitted to a short pivoted section of track 88 to which arm 87 is joined, as shown in Figs. 3 and 8, so that the outer end 89 of track section 88 swings between the dotted line positions shown in Fig. 7. The opposite or inner end of track section 88 is pinned to member 90 directly opposite the outer end of channel member 37, forming a channeled extension of the principal track section, no matter what pivotal position is assumed by short section 88.

Upon extension of blade 18 from the airfoil, track section 88 receives and guides a roller 91 mounted at the end of pitch control arm assembly 92, the opposite end of which is connected to the blade pitch housing 93. The latter is mounted for rotation in the blade retention housing 46 by bearings 94, and is pivoted by arm assembly 92 upon swinging movement of short track section 88, as controlled by the swashplate mechanism and the linkages described. To accommodate swinging movement of track section 88 in a plane, roller 91 is mounted for rotation on a ball joint 194 carried at the outer end of a plunger 95 forming a part of the arm assembly 92 and slidable in a sleeve 196 carried in a bore formed in arm assembly 92. As shown in Fig. 7, when the end of the track section 88 is displaced from centered condition, plunger 95 slides relative to arm assembly 92.

The blade retention housing 46 is guided in radial displacement during blade extension and retraction by a blade carriage comprising support members 96 and 97 each of which is rigidly connected to housing 46 as shown in Fig. 3, and also to one another to form a rigid triangular structure. Three pairs 98 of rollers, each pair including two relatively perpendicularly mounted rollers are carried by supports 96 and 97 at their ends for engagement with the internal horizontal and vertical side surfaces of track channels 37 in such a way as to minimize frictional engagement with the track channels during blade extension and retraction, while rigidly supporting the blade retention housing 46 in radial position. As shown in Fig. 3, two pairs of the rollers engage the forward channel, while only one pair engages the rear channel at a radially inward location, so that when blade 18 is fully extended none of the pairs of rollers engages the pivoted track section 88. This allows the blade 18 to be pivoted by arm assembly 92 and track section 88, while at the same time being rigidly supported for rotation by the blade retention housing cradled in supports 96 and 97.

Each of the blades 18 has its root end 100 firmly supported in the outer end of the blade pitch housing 93 for pivotal movement therewith about the blade pitch axis as shown in Fig. 4, rubber cushions 101 being interposed therebetween above and below the root end of the blade to accommodate a certain amount of root and blade pivoting in a flapping sense, which may be described as angular displacement out of the plane of the airfoil. The blades are each made up of a series of sections 102 and joints interconnecting the sections for limited flapping throughout an arc of a few degrees relative to one another. Sections 102 are formed to have progressively increasing lengths in a radial sense beginning with the innermost section and progressing outward, in order that blade retraction may be accomplished with minimum vibration transmitted to the airfoil structure, taking into consideration the fact that flapwise air loading of the blades is diminished as retraction progresses. Sections 102 are held together in end-to-end relation by a tension cable 103 extending through the sections and fastened at its opposite ends to the outer section 102 and to support member 104 pinned to the blade retention housing 46.

Each of the blade sections 102 comprises a forward extrusion 105 formed of a light material such as magnesium to have an airfoil shape shown in Fig. 9 and a hollow interior 106. The rear portion of the blade section in a chordal sense comprises upper and lower sheets 107 of metallic skin connected together at the trailing edge of the blade section by a supporting wedge 108. The tension cable 103 passes through the hollow interior of the forward extrusion 105 and is cushioned above and below by rubber sections 109 held in compressed condition in channel member 110. Thus, while the cable 103 is maintained in position interiorly of the blade section, it may be slightly deflected to relieve excess loading on the cable as it oscillates between greater and lesser degrees of curvature assumed by the flapping blade sections during rotation thereof. Each joint between adjacent blade sections 102 comprises a roller and roller guide structure, similar to a dovetail connection, including a pair of rounded nose portions 111 formed at the outer end of one section and received in guides 112 formed at the inner end of the adjacent section. Forward nose 111 is positioned at the forward portion of the blade, while the rearward nose is carried at a position about 35 percent of the chordal distance rearwardly of the forward nose portion.

Nose portions 111 are each conveniently housed between rubber cushions 113 carried in guides 112 to reduce blade vibration, and the joints between adjacent sections 102 are filled by rubber cushions 114 allowing flexure between adjacent sections, while maintaining a smooth blade surface. In addition, the leading edge of each of the blades is covered by a thin strip 115 of rubber for protection against abrasion during blade retraction and extension.

Since the connections between adjacent blade sections 102 comprise a pair of chordally spaced nose portions 111 and guide 112, relative pivoting between adjacent blade sections is constrained to limited flapping about chordal axes and limited pivoting in the plane of blade rotation, as is desired to reduce cyclic vibration. The same pivoting between adjacent sections accommodates inward retraction of the blades on the track sections 36 which are necessarily curved due to their vertically staggered disposition at the center of the airfoil. The innermost section 102 mounts a blade shaped sheet of rubber 120 at its trailing edge to extend into the airfoil while the blade is extended. Sheet 120 is subjected to pivoting with the blade about its pitch axis, but readily deflects upon engagement with rubber cushion 40 at the airfoil opening 38.

As outlined in the introduction, blade extension prior to take-off may be accomplished by rotating the airfoil through the right angle drive system described, and unclutching shaft 61 to allow free rotation of drum 55 and subsequent radial displacement of the blades due to centrifugal loading thereof. While in helicopter flight, the convertiplane may be directionally controlled through the cyclic and collective pitch control mechanism described. As the aircraft gains forward speed, power transmission to the airfoil from the engine may be cutoff by disconnecting clutch 28 to place the airfoil in autogyration, control of the blades being continued as desired to control the direction of flight and the degree of lift transmitted to the aircraft by the blades. As airplane conversion speeds are approached, the collective pitch of the blades is reduced, slowing the rate of autogyration of the airfoil, while the airfoil itself assumes more of the lifting loads due to its fixed wing effect. When conversion speeds are reached, the collective pitch of the blades is reduced to zero to minimize flapping thereof and to enable their retraction into the airfoil with a minimum of vibration transmitted to the airfoil. Retraction is accomplished by clutching shaft 61, causing drum 55 to rotate relative to the airfoil, the speed of which remains approximately the same as the blades are retracted due to the utilization of kinetic energy of rotation of the airfoil to draw the blades inward against centrifugal loading. Following retraction of the blades rotation of the airfoil is arrested by brake 32 as its speed drops.

In converting from airplane to autogyro flight, the airfoil may be driven up to speed by engaging clutch 28 and the blades extended by unclutching shaft 61 to allow free rotation of the drum. Following blade extension, clutch 28 is disengaged to allow autorotation of the airfoil and blade system by virtue of windmilling of the blades as controlled by the pilot. During landing, as forward speed of the aircraft decreases, clutch 28 may be engaged to transmit power to the airfoil to be accompanied by blade pitch control, as in helicopter flight.

I claim:

1. An aircraft, comprising a fuselage having a tail section, forward propulsion means carried by said aircraft, a disc-shaped airfoil mounted on said fuselage for rotation about an axis extending substantially vertically from said fuselage and fixed relative thereto, said airfoil being adapted to transmit lift to said aircraft during forward airborne movement thereof, means for rotating said airfoil about said axis, a plurality of rotary wing blades mounted for rotation with said airfoil, means mounting said blades for pivotal displacement about pitch axes extending in the directions of blade elongation and for substantially radial displacement relative to said airfoil, means connected to said blades for extending said blades outside and retracting said blades inside said airfoil substantially radially relative thereto, and means connected to said blades for transmitting thereto cyclic and collective pivotal movement about said axes relative to said airfoil to vary the direction of thrust transmitted to said aircraft by said blades during rotation thereof outside said airfoil.

2. The invention as defined in claim 1 in which each of said blades has a length at least as long as the radius of said airfoil.

3. The invention as defined in claim 1 in which said airfoil has a diameter between 33% and 50% of the diameter of the circle described by the tips of said blades in fully extended condition.

4. The invention as defined in claim 3 in which said tail section includes stabilizer surfaces having a transverse dimension between 30% and 55% of the diameter of the circle described by the tips of said blades when fully extended.

5. The invention as defined in claim 1 in which said blade mounting means comprise a series of substantially radially extending tracks mounted within said airfoil.

6. The invention as defined in claim 5 in which said tracks are vertically staggered at the axis of said airfoil.

7. An aircraft, comprising a fuselage having a tail section, forward propulsion means carried by said aircraft, a disc-shaped airfoil mounted on said fuselage for rotation about an axis extending substantially vertically from said airfoil and fixed relative thereto, said airfoil being adapted to transmit lift to said aircraft during forward airborne movement thereof, means for rotating said airfoil about said axis, a plurality of rotary wing blades mounted for rotation with said airfoil, means mounting said blades for pivotal displacement about pitch axes extending in the direction of blade elongation and for substantially radial displacement relative to said airfoil, said means comprising a series of substantially radially extending tracks carried in said airfoil and blade carriages mounted for guided displacement in said tracks, said carriages including means mounting the root ends of said blades for rotation about said pitch axes, means connected to said carriages for extending and retracting said blades respectively outside and inside said airfoil and means connected to said blades for transmitting thereto cyclic and collective pivotal movement about said axes relative to said aircraft by said blades during rotation thereof outside said airfoil.

8. The invention as defined in claim 7 in which each blade pivoting means includes an arm connected to the root end of a blade to rotate said blade about the pitch axis thereof, a lever carried in the outer portion of said airfoil and engageable by said arm upon complete extension of said blade, and means connected to said lever for transmitting cyclic and collective pivotal displacement thereto.

9. The invention as defined in claim 8 in which said lever comprises a separate track extension of said carriage track, said track extension having an inner end pivotally mounted adjacent the outer end of said carriage track.

10. The invention as defined in claim 8 in which said last named means comprise a pilot controllable swashplate mechanism, and a push-pull linkage interconnecting said swashplate mechanism and said lever.

11. The invention as defined in claim 7 in which said blade retracting means comprise a central drum mounted in said airfoil for free rotation therein, means for rotating said drum relative to said airfoil, and a series of cables connected to said carriages and wound on said drum for retracting and extending said blades in accordance with rotation of said drum relative to said disc.

12. The invention as defined in claim 11 in which said drum rotating means comprises a brake, a control for said brake, and means operatively connected to said drum and engageable by said brake for transmitting torque to said drum.

13. The invention as defined in claim 12 in which said torque transmitting means includes a shaft, and a planetary drive rotatably interconnected between said shaft and said drum for rotating said drum relative to said disc upon braking of said shaft.

14. The invention as defined in claim 11 including means for locking said airfoil against rotation upon retraction of said blades.

15. The invention as defined in claim 7 in which each of said blades comprises a series of articulated blade sections and joints interconnecting said sections in end-to-end relation for limited pivotal movement about chordal axes and for resisting relative pivotal movement about the blade pitch axis, and a cable extending through said sections and connected to one of said blade carriages for retaining said sections in end-to-end relation.

16. The invention as defined in claim 15 in which said airfoil has peripheral blade openings and resilient blade guides surrounding said openings for successive engagement with said blade sections upon retraction thereof to align said sections in the planes of said corresponding tracks.

17. The invention as defined in claim 16 in which said sections have progressively increasing lengths in the direction of blade extension relative to said airfoil.

18. The invention as defined in claim 7 in which said airfoil rotating means include surfaces carried by said airfoil in spaced relation to the axis thereof for extension into and forcible engagement by the airstream flowing adjacent said airfoil.

19. An aircraft, comprising a fuselage having a tail section, forward propulsion means carried by said aircraft, a disc-shaped airfoil carried above the fuselage for transmitting lift to the aircraft during forward airborne movement thereof, means for axially rotating the airfoil, a plurality of rotary wing blades carried by and extending substantially radially from the airfoil for rotation therewith, and means connected with the blades for transmitting thereto cyclic and collective pivotal movement about their pitch axes and relative to the airfoil whereby the direction of thrust transmitted by the blades to the aircraft may be controlled.

20. An aircraft, comprising a fuselage having a tail section, forward propulsion means carried by said aircraft, a disc-shaped airfoil carried above the fuselage for transmitting lift to the aircraft during forward airborne movement thereof, means for axially rotating the airfoil, a plurality of rotary wing blades carried by and extending substantially radially from the airfoil for rotation therewith, means connected with the blades for displacing them substantially radially between extended and retracted positions relative to the airfoil, and means connected with the blades for transmitting thereto cyclic and collective pivotal movement about their pitch axes and relative to the airfoil during extended condition of the blades whereby the direction of thrust transmitted by the blades to the aircraft may be controlled.

References Cited in the file of this patent

UNITED STATES PATENTS

| | | |
|---|---|---|
| 2,464,285 | Andrews | Mar. 15, 1949 |
| 2,684,212 | Vanderlip | July 20, 1954 |